(12) United States Patent
Pham et al.

(10) Patent No.: US 8,351,740 B2
(45) Date of Patent: Jan. 8, 2013

(54) CORRELATABILITY ANALYSIS FOR SPARSE ALIGNMENT

(75) Inventors: Tuan Quang Pham, New South Wales (AU); Stephen James Hardy, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 1063 days.

(21) Appl. No.: 12/332,251

(22) Filed: Dec. 10, 2008

(65) Prior Publication Data

US 2009/0148051 A1 Jun. 11, 2009

(30) Foreign Application Priority Data

Dec. 11, 2007 (AU) ................. 2007240236

(51) Int. Cl.
*G06K 9/00* (2006.01)
(52) U.S. Cl. ...................... 382/294; 382/205
(58) Field of Classification Search .................. None
See application file for complete search history.

(56) References Cited

U.S. PATENT DOCUMENTS

| | | | | |
|---|---|---|---|---|
| 5,611,000 A | * | 3/1997 | Szeliski et al. ............. | 382/294 |
| 5,649,032 A | * | 7/1997 | Burt et al. ................. | 382/284 |
| 5,987,164 A | * | 11/1999 | Szeliski et al. ............. | 382/154 |
| 6,044,181 A | * | 3/2000 | Szeliski et al. ............. | 382/284 |
| 6,097,854 A | * | 8/2000 | Szeliski et al. ............. | 382/284 |
| 6,173,087 B1 | * | 1/2001 | Kumar et al. ............... | 382/284 |
| 6,301,377 B1 | | 10/2001 | Taylor, Jr. | |
| 6,571,024 B1 | * | 5/2003 | Sawhney et al. ............ | 382/294 |
| 6,711,293 B1 | | 3/2004 | Lowe | |
| 6,738,532 B1 | * | 5/2004 | Oldroyd ................... | 382/294 |
| 6,865,011 B2 | | 3/2005 | Whitehead et al. | |
| 7,269,299 B2 | * | 9/2007 | Schroeder ................ | 382/294 |
| 8,090,218 B2 | * | 1/2012 | Larkin et al. .............. | 382/289 |
| 2005/0238198 A1 | | 10/2005 | Brown et al. | |

(Continued)

FOREIGN PATENT DOCUMENTS

JP 2007-505330 3/2007

(Continued)

OTHER PUBLICATIONS

Zitova et al., "Image registration methods: a survey", Image and Vision Computing 21, 2003, pp. 977-1000.

Yetik et al., "Performance Bounds on Image Registration", IEEE Translations on Signal Processing, vol. 54, No. 5, May 2006, pp. 1737-1749.

(Continued)

*Primary Examiner* — Barry Drennan
(74) *Attorney, Agent, or Firm* — Fitzpatrick, Cella, Harper & Scinto

(57) ABSTRACT

Disclosed herein is a method of estimating a geometrical relationship between a first image (101) and a second image (102), wherein the second image (102) includes a noise component. The method determines a location and size of each one of a plurality of image patches (201), based on the noise component included in the second image (102) and correlation information derived from the first image (101). The method then identifies a plurality of first image areas in the first image and a corresponding plurality of second image areas in the second image, based on the location and size of each one of the plurality of image patches. Each first image area of the first image (101) corresponds to a related second image area of the second image (102). The method then determines a geometrical relationship between the first and second images (101, 102) by comparing, for each one of the first image areas, information located within the first image area with information located within the corresponding related second image area.

17 Claims, 7 Drawing Sheets

U.S. PATENT DOCUMENTS

2007/0122060 A1 5/2007 Hardy et al.
2008/0019611 A1 1/2008 Larkin et al.

FOREIGN PATENT DOCUMENTS

WO 2005/010604 2/2005
WO 2005/096218 10/2005

OTHER PUBLICATIONS

Australian Examiners Report dated Jan. 18, 2010 in corresponding Australian Application No. 2007240236.

* cited by examiner

CORRELATABILITY ANALYSIS FOR SPARSE ALIGNMENT

CROSS-REFERENCE TO RELATED APPLICATION

The present application claims the benefit of Australian Patent Application No. 2007-240236, filed on Dec. 11, 2007, the contents of which are hereby incorporated by reference as fully stated herein.

FIELD OF THE INVENTION

The present invention relates to the field of image registration and, in particular, to determining image patches with optimal locations and sizes for fine image alignment to a predefined level of accuracy.

BACKGROUND

Image registration is the process of determining correspondences between pixel elements in a pair of images that have common subject matter. It is an important technique in fields such as image matching, imaging device characterisation, and super-resolution. In image matching, two images are compared for common subject matter under the assumption that some geometrical transformation relates substantial portions of the two images.

Two images $f_1(x, y)$ and $f_2(x, y)$ can be related by a combination of Rotation, Scaling, and Translation (RST) transformations, such that:

$$f_2(x,y) = f_1(s(x \cos \theta + y \sin \theta) + \Delta_x, s(-x \sin \theta + y \cos \theta) + \Delta_y) \quad (1)$$

wherein s is a scale factor, $\theta$ is a rotation angle, and $(\Delta_x, \Delta_y)$ are translations in x and y directions. The unknown rotation $\theta$ and scale s parameters may be determined from translation invariant representations $T_{f_1}$ and $T_{f_2}$ of the images $f_1(x, y)$ and $f_2(x, y)$, correspondingly. For example, a recombination of the Fourier magnitude |F| and the Laplacian of the Fourier phase $=^2\phi$ is invariant to any translation applied to the constituting image f:

$$T_f = |F| + iA\nabla^2 \phi \quad (2)$$

where A is a scaling constant set to:

$$A = \max(|F|)/\pi \quad (3)$$

to ensure that the recombined Fourier magnitude and phase information are roughly of equal magnitude.

After the rotation $\theta$ and scale s parameters are determined, the image $f_2(x, y)$ can be transformed to correct for the rotation and scaling. The translation parameters $(\Delta_x, \Delta_y)$ can then be estimated from the image $f_1(x, y)$ and the transformed image $f'_2 (x, y)$ by finding a distinct peak in a cross-correlation image:

$$C = \Im^{-1}(\Im(f_1)\Im(f_2)^*) \quad (4)$$

where $\Im(f)$ is the discrete Fourier transform of an image f(x, y), and $\Im(f_2)^*$ denotes the complex conjugation of the discrete Fourier transform $\Im(f_2)$.

While a simple parametric transformation such as RST is suitable for registration of flat, rigid objects under frontal views, the transformation between two images in most applications is usually more complicated. In the general case, the transformation can be expressed as a free-form motion that warps one image onto a substantial part of the other image. This transformation is defined by a full warp map, which specifies a two-dimensional motion vector for each pixel of either image. This full warp map can be obtained from dense optical flow estimation. The full warp map can also be interpolated from a set of sparse point correspondences between the two images. Although there are many algorithms that detect and match salient points/regions from images, none of them is able to specify the level of registration accuracy that the algorithm returns.

Cramer-Rao Bound for Image Registration

The mean squared error of any estimate of a deterministic parameter in the presence of noise has a lower bound known as the Cramer-Rao Bound (CRB). Specifically, if a parameter vector $m = [m_0, m_1, \ldots m_n]^T$ is estimated from a given set of measurements, the CRB provides a lower bound on the error covariance matrix:

$$E[\varepsilon \varepsilon^T] \geq \left(I + \frac{\partial b}{\partial m}\right) F^{-1}(m) \left(I + \frac{\partial b}{\partial m}\right)^T + bb^T \quad (5)$$

where $\varepsilon = \hat{m} - m$ is the estimation error (the hat sign denotes an estimate of the variable underneath); $b = E[\hat{m}] - m$ is the bias of the estimator (E[.] is the expectation of the enclosed expression); I is the identity matrix; F (m) is the Fisher Information Matrix (FIM) that characterizes how well the unknown parameter vector m can be estimated from the observed data; and $F^{-1}$ is the inverse of F. The $\geq$ sign in (5) means that the difference between the left matrix and the right matrix is non-negative definitive. As a result, the inequality holds for all diagonal terms.

If the estimator is unbiased (i.e., b=0), the expected variance of the parameters can be found directly from the main diagonal entries of the inverse matrix $F^{-1}$:

$$E[(\hat{m}_i - m_i)^2] \geq [F^{-1}(m)]_{ii} \quad (6)$$

The Fisher information matrix is derived from the maximum likelihood principle. Let Pr(r|m) be the probability density function of an observed noisy data r(m), the Fisher information matrix is a measure of the steepness of the likelihood function around its peak:

$$F[m] \geq E\left[\frac{\partial}{\partial m} \log Pr(r|m)\right]\left[\frac{\partial}{\partial m} \log Pr(r|m)\right]^T \quad (7)$$

Since the peak of a steep likelihood function is less sensitive to noise than that of a smooth one, the FIM characterizes how precisely m can be estimated from the observed data.

Fisher Information Matrix for Image Registration

A direct image registration method searches for a parametric transformation between the coordinate systems of two images based on their intensity correlation. Assuming that both images $I_1$ and $I_2$ are noise corrupted versions of a noiseless scene I by two instances of zero-mean Gaussian noise with variance $\sigma_n$, $$I^*_1(x,y) = I_1(x,y) + n_1(x,y) = I(x,y) + n_1(x,y)$$

$$I^*_2(x,y) = I_1(x,y) + n_2(x,y) = I(x',y') + n_2(x,y) \quad (8)$$

where x'=f(x, y, m) and y'=g(x, y, m) are the coordinate transformations, and $m = [m_1, m_2, \ldots m_n]^T$ is the unknown registration parameter (e.g., under translation $x' = x - t_x$, $y' = y - t_y$ and $m = [t_x, t_y]^T$). Since the noise realizations $n_1$ and $n_2$ are normally distributed over the registration region S, the total probability of the unknown scene I given an estimate of m is:

$$Pr(l|\hat{m}) = \prod_S \frac{1}{\sigma_n \sqrt{2\pi}} \left(-\frac{(l_1^* - l)^2}{2\sigma_n^2}\right) \prod_S \frac{1}{\sigma_n \sqrt{2\pi}} \left(-\frac{(l_2^* - l')^2}{2\sigma_n^2}\right) \quad (9)$$

where the implicit coordinates for $I_1$, $I_2$ and $I$ is $(x, y)$ except for $I'=I(x', y')$. The log-likelihood function therefore is:

$$\log Pr(l|\hat{m}) = -\frac{1}{2\sigma_n^2} \sum_S \{(l_1^* - l)^2 + (l_2^* - l')^2\} + \text{const} \quad (10)$$

From (7), the Fisher information matrix for a n-parameter vector m is thus a n×n matrix F with its entries computed as:

$$F_{ij} = -E\left[\frac{\partial^2}{\partial m_i \partial m_j} \log Pr(l|\hat{m})\right] = -E\left[\frac{\partial}{\partial m_i}\left(\frac{1}{\sigma_n^2} \sum_S (l_2 - l')\frac{\partial l'}{\partial m_j}\right)\right]$$

$$= -E\left[\frac{1}{\sigma_n^2} \sum_S \left(n_2 \frac{\partial^2 l'}{\partial m_i \partial m_j} - \frac{\partial l'}{\partial m_i} \frac{\partial l'}{\partial m_j}\right)\right] = \frac{1}{\sigma_n^2} \sum_S \frac{\partial l'}{\partial m_i} \frac{\partial l'}{\partial m_j} \quad (11)$$

where the derivative of the noiseless image $I'=I(x', y')$ with respect to each unknown parameter $m_i$ can be computed from its spatial derivatives and the registration model $\{x', y'\}=\{f(x, y, m), g(x, y, m)\}$:

$$\frac{\partial l'}{\partial m_i} = \frac{\partial l'}{\partial x'} \frac{\partial x'}{\partial m_i} + \frac{\partial l'}{\partial y'} \frac{\partial y'}{\partial m_i} \quad (12)$$

Cramer-Rao Bound for 2D Shift Estimation

Using the general derivation of the Fisher information matrix in the previous subsection, the Cramer-Rao bound for any unbiased shift estimator can be derived. Two-dimensional (2D) shift estimation looks for a translational vector $t=[t_x, t_y]^T$ between the coordinate systems of the two images: $x'=x-t_x$ and $y'=y-t_y$. The Fisher information matrix can be computed from (11) and (12):

$$F(t) = \frac{1}{\sigma_n^2} \begin{bmatrix} \sum_S l_x^2 & \sum_S l_x l_y \\ \sum_S l_x l_y & \sum_S l_y^2 \end{bmatrix} = \frac{1}{\sigma_n^2} T \quad (13)$$

where $l_x = \partial l'/\partial x' = \partial l'/\partial x$ and $l_y = \partial l'/\partial y' = \partial l'/\partial y$ are spatial derivatives of the uncorrupted image $I'$. As can be seen in (13), the FIM for 2D shift estimation is proportional to a Gradient Structure Tensor T (GST) integrated over the region S.

Substitution of (13) into (6) yields the Cramer-Rao bounds of the variances of the registration parameters:

$$\text{var}(t_x) \geq [F^{-1}]_{11} = \sigma_n^2 \sum_S l_y^2 / \text{Det}(T) \quad (14)$$

$$\text{var}(t_y) \geq [F^{-1}]_{22} = \sigma_n^2 \sum_S l_x^2 / \text{Det}(T)$$

where $$\det(T) = \sum_S l_x^2 \sum_S l_y^2 - \left(\sum_S l_x l_y\right)^2$$

is the determinant of T. Ignoring the second term of det(T), the Cramer-Rao bounds (14) are simplified to looser bounds:

$$\text{var}(t_x) \geq \sigma_n^2 \bigg/ \sum_S l_x^2 \quad (15)$$

$$\text{var}(t_y) \geq \sigma_n^2 \bigg/ \sum_S l_y^2$$

which clearly shows that the shift variance is linearly proportional to the input noise variance $\sigma_n^2$ and inversely proportional to the total gradient energy in the shift direction. As a result, scenes with strong textures and little noise are likely to result in accurate shift estimation. However, the equality of the loose bound in (15) is hardly achievable (since $$\left(\sum_S l_x l_y\right)^2$$

only vanishes when the orientation of maximum gradient energy is aligned with one of the grid axes).

Note that the CRB characterizes the shift variances based on an uncorrupted signal I, which is not available in practice. Fortunately, the total gradient energies of I can be approximated from those of the corrupted image $I^*_1$ and a noise instance n given a normal distribution $N(0, \sigma_n)$:

$$E\left[\sum_S (l_x^*)^2\right] = \sum_S l_x^2 + E\left[\sum_S n_x^2\right] = \sum_S l_x^2 + \text{var}(n_x)\sum_S 1 \quad (16)$$

$$E\left[\sum_S (l_y^*)^2\right] = \sum_S l_y^2 + E\left[\sum_S n_y^2\right] = \sum_S l_y^2 + \text{var}(n_y)\sum_S 1$$

$$E\left[\sum_S l_x^* l_y^*\right] = \sum_S l_x l_y$$

where $l^*_x = \partial l^*_1/\partial x$, $l^*_y = \partial l^*_1/\partial y$, $n_x = \partial n/\partial x$, and $n_y = \partial n/\partial y$.

Cramer-Rao Bound for 2D Projective Registration

The Cramer-Rao bound is not only applicable to shift estimation, but also to more general motion models such as 2D affine and projective transformation. A 2D projective transformation, for example, is the motion of a static scene captured by a stationary camera or the motion of a moving planar surface. It is the most general planar motion model which includes translation, Euclidean, similarity, and affine transformations. Similarly to 2D translation, the Cramer-Rao bounds for the eight projective parameters are computed from an 8×8 Fisher information matrix.

Planar projective registration seeks an 8-parameter vector $m=[m_1, m_2, \ldots m_8]^T$ that transforms one coordinate system $(x, y)$ into another $(x', y')$:

$$\begin{bmatrix} X \\ Y \\ D \end{bmatrix} = \begin{bmatrix} m_1 & m_2 & m_3 \\ m_4 & m_5 & m_6 \\ m_7 & m_8 & 1 \end{bmatrix} \cdot \begin{bmatrix} x \\ y \\ 1 \end{bmatrix} \quad (17)$$

-continued $$x' = \frac{X}{D} = \frac{m_1 x + m_2 y + m_3}{m_7 x + m_8 y + 1}, y' = \frac{Y}{D} = \frac{m_4 x + m_5 y + m_6}{m_7 x + m_8 y + 1} \quad (18)$$

Substituting $$\left[\frac{\partial x'}{\partial m} \quad \frac{\partial y'}{\partial m}\right]^T = \frac{1}{D}\begin{bmatrix} x & y & 1 & 0 & 0 & 0 & -x'x & -x'y \\ 0 & 0 & 0 & x & y & 1 & -y'x & -y'y \end{bmatrix}$$

into (12) yields:

$$\left[\frac{\partial l'}{\partial m}\right]^T = \frac{1}{D}\left[x\frac{\partial l'}{\partial x'} \quad y\frac{\partial l'}{\partial y'} \quad \frac{\partial l'}{\partial x'} \quad x\frac{\partial l'}{\partial y'} \quad y\frac{\partial l'}{\partial y'} \quad \frac{\partial l'}{\partial y'} \quad \ldots \right. \quad (19)$$
$$\left. -x\left(x'\frac{\partial l'}{\partial x'} + y'\frac{\partial l'}{\partial y'}\right) \quad -y\left(x'\frac{\partial l'}{\partial x'} + y'\frac{\partial l'}{\partial y'}\right)\right]$$

The 8×8 Fisher information matrix is rewritten from (11) and (19) as:

$$F(m) = \frac{1}{\sigma_n^2}\sum_S \left[\frac{\partial l'}{\partial m}\right]\left[\frac{\partial l'}{\partial m}\right]^T \quad (20)$$

Due to a complex 8×8 matrix inversion, the exact formula for the Cramer-Rao bounds of 2D projective registration is not given here. The bounds can be computed from the diagonal entries of the inverse Fisher information matrix $F^{-}(m)$. Similarly to the shift estimation case, the lower variance bounds of the 2D projective parameters are proportional to the input noise variance and inversely proportional to the total gradient energy.

The Fisher information matrix, or alternatively the gradient structure tensor and hence the Cramer-Rao Lower Bound, quantifies the amount of information in an image for the determination of the n-parameter vector m. For shift estimation, the correlation information determines how precisely the shift can be estimated for a given area, given a certain amount of noise corrupting the image.

SUMMARY

It is an object of the present invention to overcome substantially, or at least ameliorate, one or more disadvantages of existing arrangements.

According to a first aspect of the present disclosure, there is provided a computer-implementable method of estimating a geometrical relationship between a first image and a second image, wherein the second image includes a noise component. The method determines a location and size of each one of a plurality of image patches, based on the noise component included in the second image and correlation information derived from the first image. The method then identifies a plurality of first image areas in the first image and a corresponding plurality of second image areas in the second image, based on the location and size of each one of the plurality of image patches. Each first image area of the first image corresponds to a related second image area of the second image. The method then determines a geometrical relationship between the first and second images by comparing, for each one of the first image areas, information located within the first image area with information located within the corresponding related second image area.

According to a second aspect of the present disclosure, there is provided a computer program product including a computer readable storage medium having recorded thereon a computer program for directing a processor to execute a method for of estimating a geometrical relationship between a first image and a second image. The second image includes a noise component. The computer program product comprising: (a) code for determining a location and size of each one of a plurality of image patches, based on the noise component included in the second image and correlation information derived from the first image; (b) code for identifying a plurality of first image areas in the first image and a corresponding plurality of second image areas in the second image, based on the location and size of each one of the plurality of image patches, wherein each first image area of the first image corresponds to a related second image area of the second image; and (c) code for determining a geometrical relationship between the first and second images by comparing, for each one of the first image areas, information located within the first image area with information located within the corresponding related second image area.

According to another aspect of the present disclosure, there is provided an apparatus for implementing the aforementioned method.

According to yet another aspect of the present disclosure, there is provided a computer program product including a computer readable medium having recorded thereon a computer program for implementing the method described above.

Other aspects of the invention are also disclosed.

BRIEF DESCRIPTION OF THE DRAWINGS

One or more embodiments of the invention will now be described with reference to the following drawings, in which.

DETAILED DESCRIPTION

Figure 1:
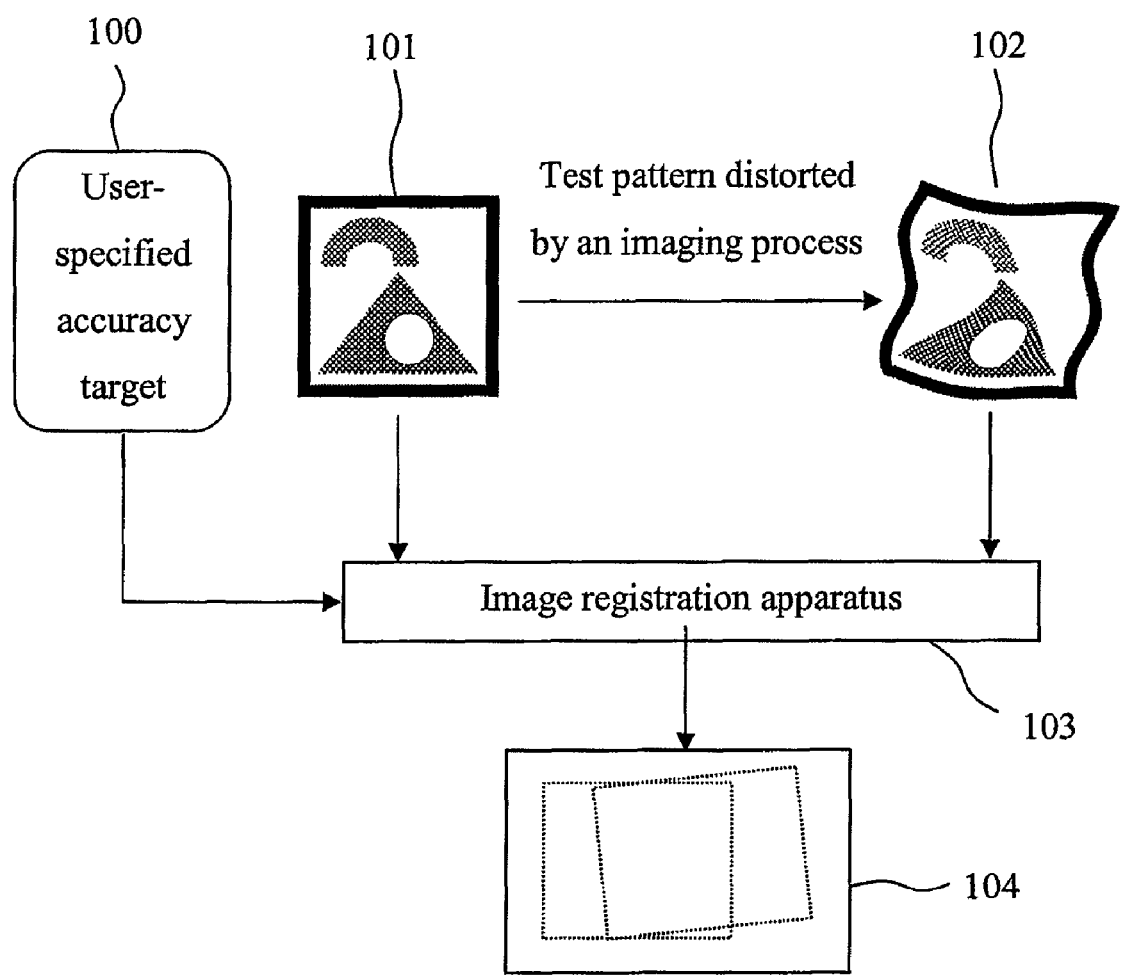
FIG. 1 is a schematic flow diagram of an application of the system.

Where reference is made in any one or more of the accompanying drawings to steps and/or features that have the same reference numerals, those steps and/or features have for the purposes of this description the same function(s) or operation(s), unless the contrary intention appears.

As described above, current image registration algorithms are unable to provide an estimate of the geometrical relationship between two images to a specified level of accuracy. An embodiment of the present disclosure employs a method of estimating the precision of motion estimation under the presence of noise. Based on this precision analysis, a set of image patches with optimal locations and sizes are selected to sparsely align the input images up to a user-specified accuracy.

Disclosed herein is a computer-implementable method of determining a geometrical relationship between a first image and a second image, wherein the second image includes a noise component. The method utilises the noise component included in the second image and correlation information derived from the first image to determine a location and size of each one of a plurality of image patches. Where a size of a first image patch is smaller than a size of a second image patch, there is more information in a region of the first image corresponding to the location of the first image patch than a region of the first image corresponding to the location of the second image patch. The method includes a step of identifying a plurality of first image areas in the first image and a corresponding plurality of second image areas in the second image, based on the location and size of each one of the plurality of image patches. Each first image area of the first image corresponds to a related second image area of the second image, and thus the first image area and corresponding second image area define related portions of the first and second images. The method then compares, for each one of the first image areas, information located within the first image area with information located within the corresponding related second image area to determine a geometrical relationship between the first and second images.

Also disclosed herein is a computer program product including a computer readable storage medium having recorded thereon a computer program for directing a processor to execute a method for of estimating a geometrical relationship between a first image and a second image, said second image including a noise component. The computer program product includes code for performing the above-mentioned method.

Further disclosed herein is a method of determining a full warp map that relates a corrupted image to a reference image. The method coarsely aligns a corrupted image against a reference image by applying a rotation-scaling-translation transformation. A plurality of correlatable image patches are then determined from the reference image. Locations and sizes of the respective image patches are determined using a theoretical variance bound. A full warp map is then determined using the image patches.

In one example, the images (i.e., the reference image and a corrupted version of the reference image) are obtained from a group of images that includes, for example, but is not limited to: (a) digital images of a document; (b) a video sequence that contains independently moving objects; (c) digital images of a scene with overlapping content; and (d) a digital image of a test chart.

Before providing a description of a preferred embodiment through a set of drawings, the theory of using the Cramer-Rao Lower Bound (CRLB) of image registration to select correlatable image patches will be described. In this disclosure, the term "correlatable patch" refers to an image patch of smallest possible size that is likely to give a desired alignment precision in the presence of known noise variance.

Equation (14) described above in the background section specifies the CRLB of shift estimation variance along the sampling directions. However, the CRLB also applies to the variance of shift estimation in any other directions. For example, if the Fisher Information Matrix F (FIM) for 2D shift estimation is decomposed into its two principal directions:

$$F = \lambda_u u u^T + \lambda_v v v^T \quad (21)$$

$$\Rightarrow F^{-1} = \frac{1}{\lambda_v} v v^T + \frac{1}{\lambda_u} u u^T$$

where u and v are the eigen-vectors of F with the corresponding eigen-values $\lambda_u \geq \lambda_v$, the CRLB for the estimated shift variance along those two directions $t_u = t \cdot u$ and $t_v = t \cdot v$ are the projections of the inverse FIM onto those principal directions:

$$\text{var}(t_u) \geq CRLB(t_u) = [F^{-1}]_{uu} = \frac{1}{\lambda_u} \quad (22)$$

$$\text{var}(t_v) \geq CRLB(t_u) = [F^{-1}]_{vv} = \frac{1}{\lambda_u}$$

Since $$\frac{1}{\lambda_v} \geq \frac{1}{\lambda_u},$$

the variance of the shift magnitude |t| is bounded by the CRLB of shift variance along the direction of minimum gradient change:

$$\text{var}(|t|) = \sigma_t^2 \geq \frac{1}{\lambda_v}.$$

The CRLB of shift variance in the direction v therefore defines how precise the shift can be estimated from a given image patch and its noise-corrupted version. This quantifies the amount of correlation information in the patch or, equivalently, its correlatability. For example, image patches composed of linear structures along only one orientation are not suitable for fine alignment because the displacement along this orientation cannot be measured accurately:

$$\lambda_u > \lambda_v = 0 \Rightarrow \text{var}(t_v) \geq \frac{1}{\lambda_v} = \infty.$$

To solve for the eigen-values of the FIM in (13):

$$F = \begin{bmatrix} a & b \\ b & c \end{bmatrix}, \quad (23)$$

where $a = \frac{1}{\sigma_n^2} \sum_S l_x^2$, $b = \frac{1}{\sigma_n^2} \sum_S l_x l_y$, $c = \frac{1}{\sigma_n^2} \sum_S l_y^2$ both $\lambda_u$ and $\lambda_v$ must satisfy the following equation: $Av = \lambda v$, where v is the corresponding eigenvector. This leads to:

$$\begin{bmatrix} a-\lambda & b \\ b & c-\lambda \end{bmatrix} v = \begin{bmatrix} 0 \\ 0 \end{bmatrix} \rightarrow (a-\lambda)(c-\lambda) - b^2 = 0 \quad (24)$$

$$\rightarrow \lambda^2 - (a+c)\lambda + ac - b^2 = 0$$

$$\rightarrow \lambda_{u,v} = \frac{a+c \pm \sqrt{\Delta}}{2}$$

where $\Delta=(a+c)^2-4(ac-b^2)=(a-c)^2+4b^2$. From (24) and (23), it is clear that $\lambda_v$ is proportional to the total gradient energy within the patch and it is inversely proportional to the noise variance. As a result, given a known noise variance, the CRLB of the variance of shift estimation can be reduced by increasing the image patch size. This leads to a strategy to select the smallest image patches that still encapsulate enough gradient energy to satisfy the alignment precision specified by the CRLB.

To minimize computation, we are interested in the smallest patches whose CRLB falls just below the desired alignment accuracy. For example, if the desired alignment accuracy is $\sigma_t=0.01$ of a pixel, $$\frac{1}{\lambda_v}$$

should be less than or equal to $\sigma_t^2=10^{-4}$. Before locating these patches, we estimate the desired patch size at each pixel that gives rise to $\lambda_v=T=1/\sigma_t^2$. This produces a Minimum Correlatable Patch Size (MCPS) image. Best patch locations are selected as local minima of this MCPS image. Apart from the minimum bound criteria, we also want the selected patches at a certain distance apart as well as evenly distributed across the image. Finally, image patches of periodic contents are not good candidates for alignment, because the self-matching characteristics of these periodic patterns may result in ambiguous displacements later in the alignment process.

An application of the proposed alignment system using the CRLB during patch selection is now described with reference to FIG. 1. After a process of printing a test image 101 onto a physical medium, followed by scanning the physical medium back to a digital image, the resulting image 102 may be distorted. In one example, the scanned image is at a downsized resolution. An image registration system 103 is used to align the images 101 and 102, thereby removing any non-rigid motion distortions that relate the two images. The output of the system is the substantially aligned images 104 or a full warp map 206 (see FIG. 2) that relates the two input images. In one embodiment, the image registration system 103 accepts a user-specified accuracy requirement $\sigma_t^2$, 100. The image registration system 103 utilises the user-specified accuracy requirement $\sigma_t^2$, 100, to adapt the processing of the image registration system 103 to minimize computations, while still honouring the required registration accuracy.

Figure 2:
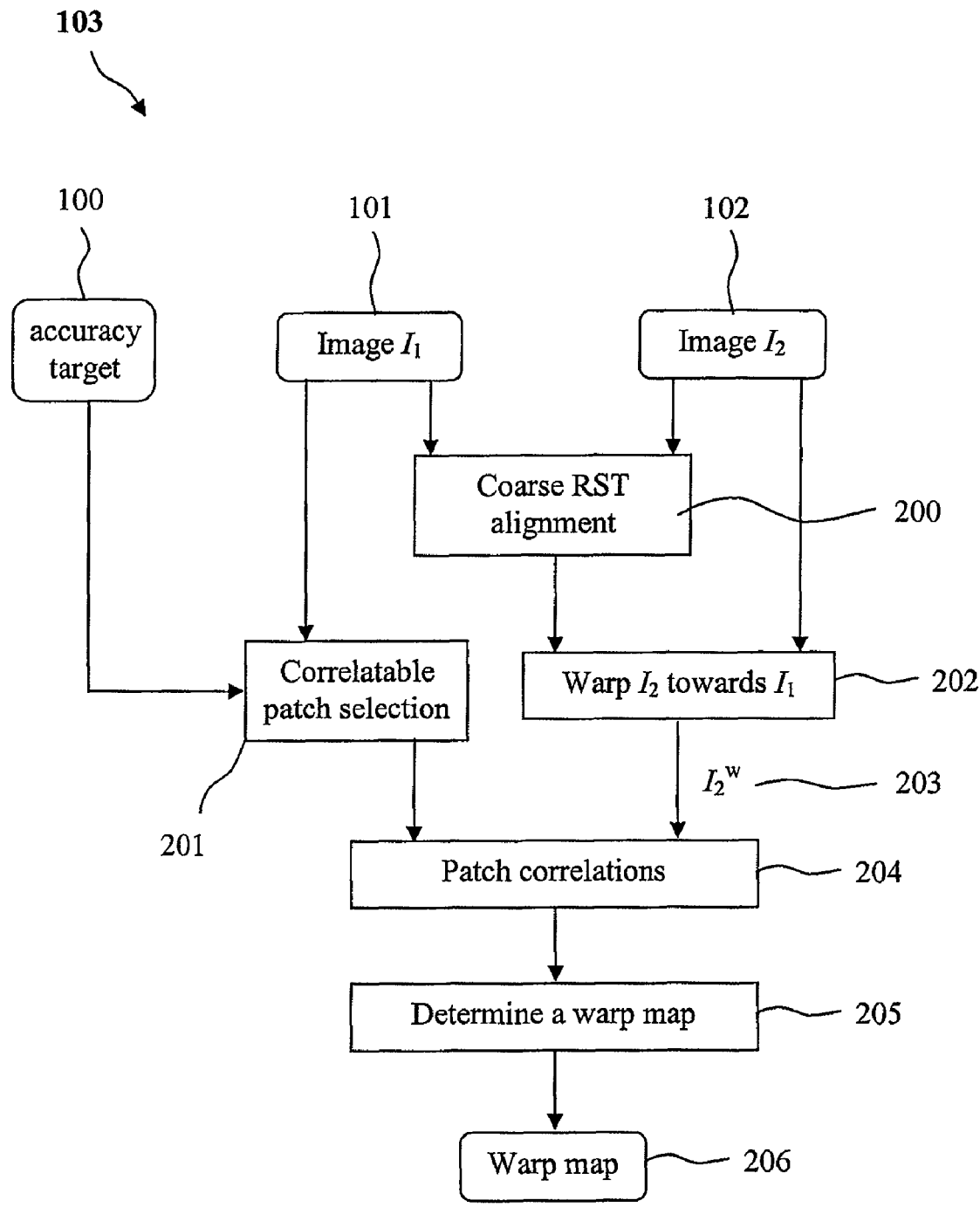
FIG. 2 is a schematic flow diagram of the fine alignment system occurring within the processes of FIG. 1.

The process of registering the images 101 and 102 performed by the image registration system 103 is now described in more detail with reference to FIG. 2. The image registration system 103 receives as inputs a reference image $I_1$, 101, a derived image $I_2$, 102, and an accuracy requirement (target) 100. Step 200 determines a coarse alignment between the two input images 101, 102 using an RST registration, as described in the background. Based on this coarse alignment, the second image $I_2$ is warped towards the reference image $I_1$ in step 202 to produce a warped image $I_2^w$, 203, which is roughly aligned to $I_1$. Step 201 receives the accuracy requirement 100 and the image 101 to perform correlatable patch selection and produce an output that is presented to step 204. Correlatability analysis is performed on the reference image to select a set of good image patches that are likely to achieve the accuracy target 100. Since $I_2^w$ is roughly aligned to $I_1$, image patches from these two images at common locations, in the form or first image areas in said first image and second image areas in said second image, will have a substantial content overlap. The method identifies the first image areas in the first image and second image areas in the second image by utilising the size and location of the image patches. By correlating these overlapping correlatable patch pair, step 204 produces a sparse set of point correspondences from $I_2^w$ towards $I_1$, each having a known accuracy confidence. Step 205 finally interpolates (determines) a full warp map 206 from the sparse set of point correspondences. In a preferred embodiment, the construction of this warp map from a set of point correspondences is done by tessellating the sparse point set using Delaunay triangulation followed by cubic surface interpolation of the vectored data within each tessellated triangle.

Figure 3:
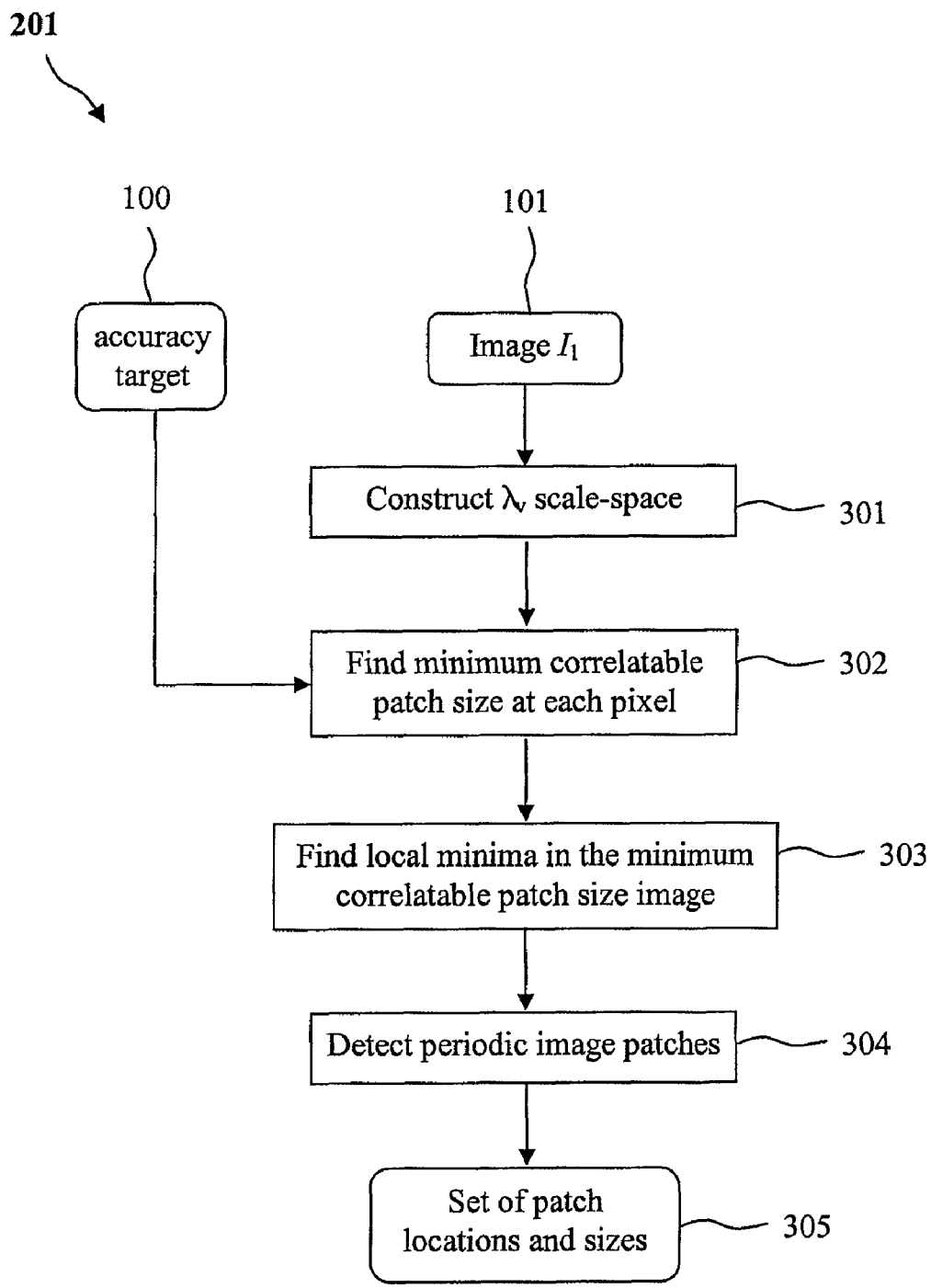
FIG. 3 is a schematic flow diagram of the correlatable patch selection step occurring within the processes of FIG. 2.

The process of selecting correlatable patches from an image in step 201 is now described in more detail with reference to FIG. 3. Step 201 receives the reference image $I_1$, 101, as input and it outputs a set of locations and sizes of correlatable patches 305. The process of correlatable patch selection involves a series of steps including constructing a $\lambda_v$ scale-space of increasing patch sizes in step 301, followed by determining a Minimum Correlatable Patch Size (MCPS) at every pixel in step 302, utilising the accuracy target 100, followed by locating local minima of the MCPS image in step 303, and finally rejecting image patches of periodic content in step 304. To reduce the number of correlatable patches as well as keeping them well-separated, the list of local minima are pruned so that no minimum points are closer than d pixels from each other (e.g., d=32). The patch sizes can also be optionally enlarged up to a closest multiple of small prime numbers (2, 3, 5) to facilitate efficient Fast Fourier Transform (FFT), should FFT be used in the correlation step 204.

Figure 4:
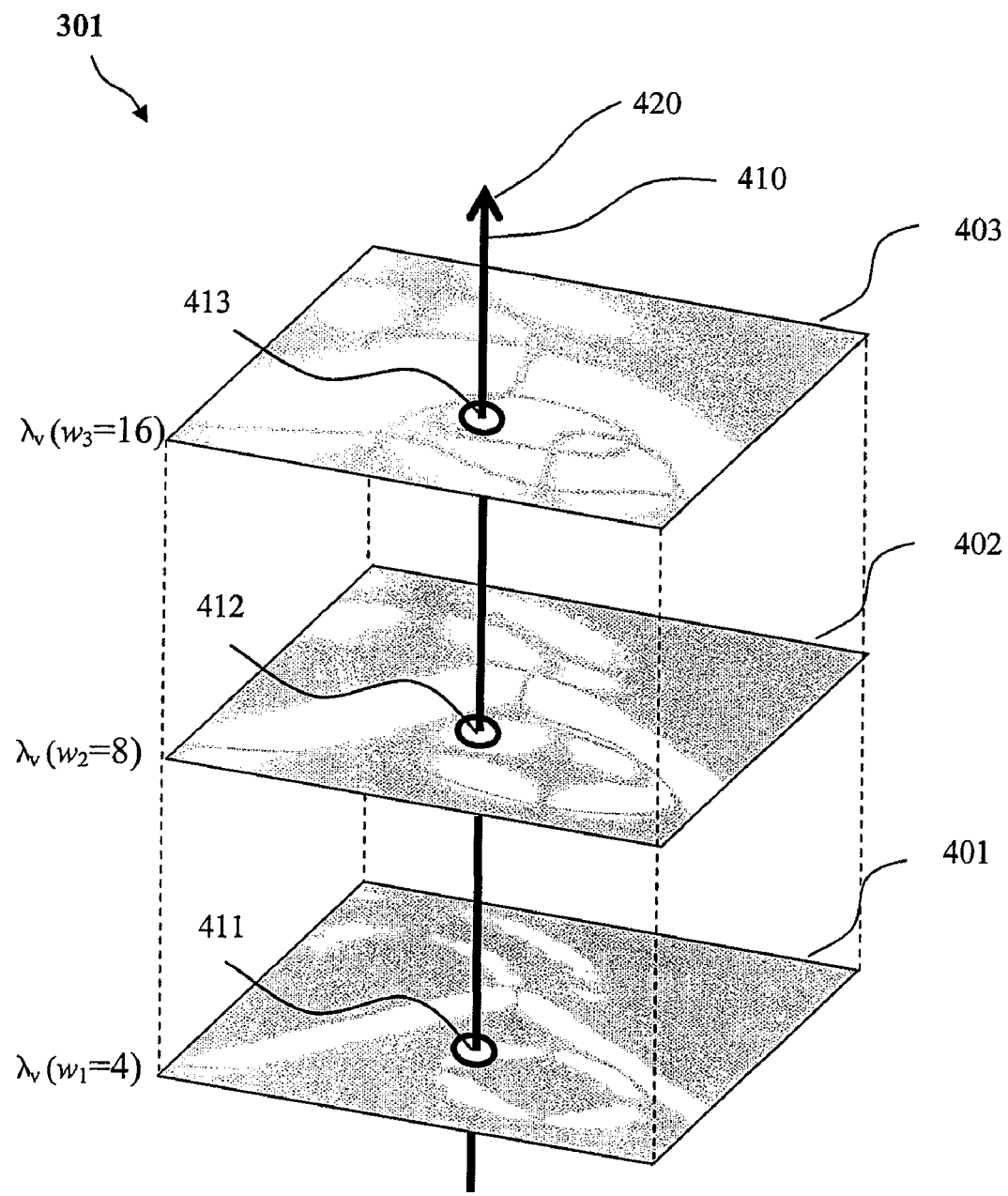
FIG. 4 is an illustration of the $\lambda_v$ scale-space occurring within the processes of FIG. 3.

The process of constructing a $\lambda_v$ scale-space of increasing patch sizes in step 301 is now described in more detail with reference to FIG. 4. According to equation (20), the shift variance bound is inversely proportional to the total gradient energy of the image patch. As a result, the CRLB decreases rapidly (with a quadratic rate) as the patch size increases. By computing $\lambda_v$ at a number of logarithmically increasing patch sizes $w_n=2^n+1$ (n=1, 2, ...), we are guaranteed to find two consecutive patch sizes $w_i<w_{i+1}$ whose smallest eigen-values of the FIM enclose the threshold: $\lambda_v^i<T\leq\lambda_v^{i+1}$. A collection of these $\lambda_v$ images 401, 402, and 403 computed with patch sizes w=4, 8, 16 forms a $\lambda_v$ scale-space in FIG. 4. The MCPS can then be linearly interpolated from the two enclosing patch sizes:

$$w_t=(\lambda_v^{i+1}-T)w_i+(T-\lambda_v^i)w_{i+1}.$$

In equation (23), the image integration over a square box can be implemented very efficiently in a separable fashion using two one-dimensional (1-D) unit filters in the x- and y-dimensions. Each of these 1-D unit filters produces the sum of w consecutive pixels within a sliding window. Since this window is moved across the image only one pixel at a time, the sum of the new window may be computed from the sum of the previous window by subtracting the intensity value of the pixel no longer included in the window, and adding the intensity value of the newly included pixel. In this way, a 2-D unit filter of arbitrary filter size w×w only costs four additions per pixel.

Figure 5:
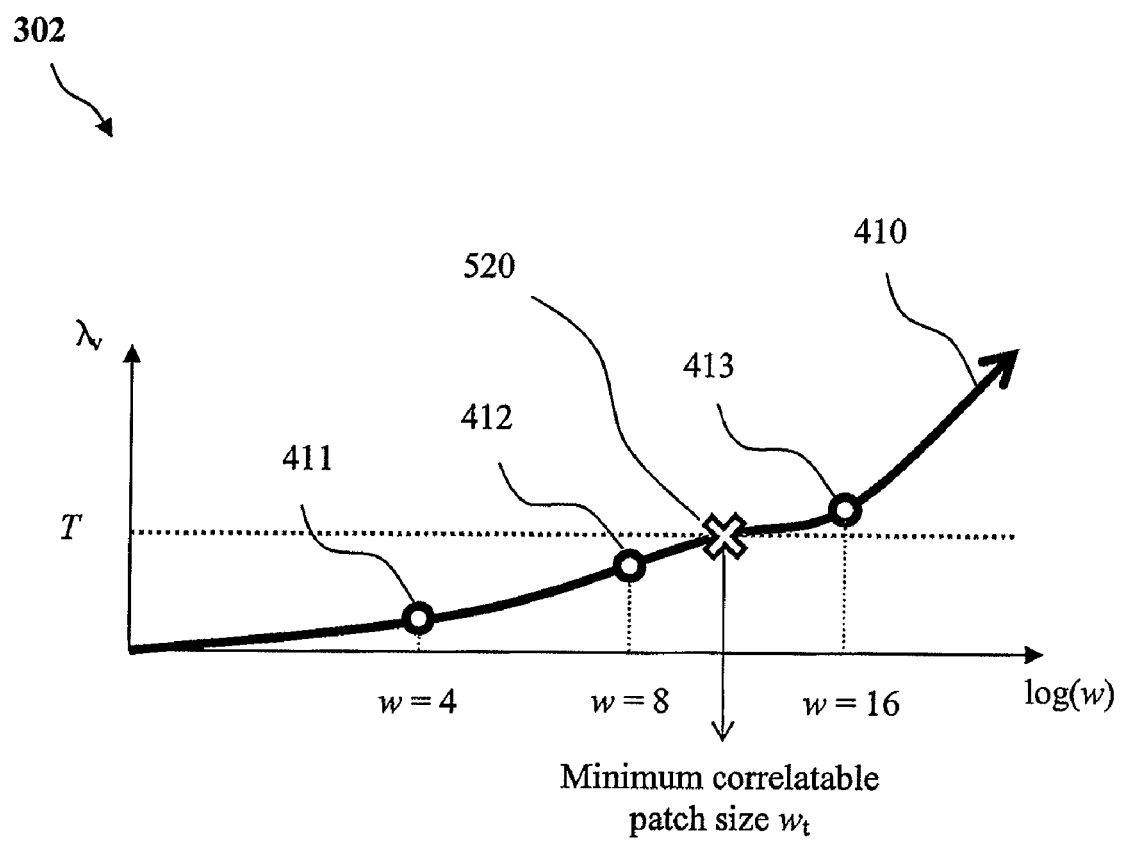
FIG. 5 is a schematic diagram illustrating how a minimum correlatable patch size can be found at each pixel as used in the method of FIG. 3.

The process of determining a minimum correlatable patch size at every pixel to satisfy the alignment accuracy requirement $\lambda_v=1/\sigma_t^2$ in step 302 is now described in more detail with reference to FIG. 4 and FIG. 5. The line 410 in FIG. 4 samples the $\lambda_v$ scale-space at pixel position (x, y). It cuts through the scale-space levels 401, 402, 403 at points 411, 412, 413 whose coordinates are (x, y, $w_1$=4), (x, y, $w_2$=8), and (x, y, $w_3$=16), respectively. Since the area of integration w×w is higher at higher levels of the scale-space, the intensities along the sampled line 410 increase in the direction of the vector 420. This monotonous increase of the intensities along the sampled line 410 is illustrated in FIG. 5. Since the intensity curve increases monotonically, there exists a patch size $w_t$ at point 520 whose corresponding $$CRLB \frac{1}{\lambda_v}$$

equals the target alignment variance $\sigma_t^2$. This optimal patch size can be estimated using linear interpolation from the adjacent patch size samples whose corresponding $\lambda_v$ intensities enclose the threshold T (e.g., $w_2=8$ and $w_3=16$ as shown in FIG. 5).

Figure 6:
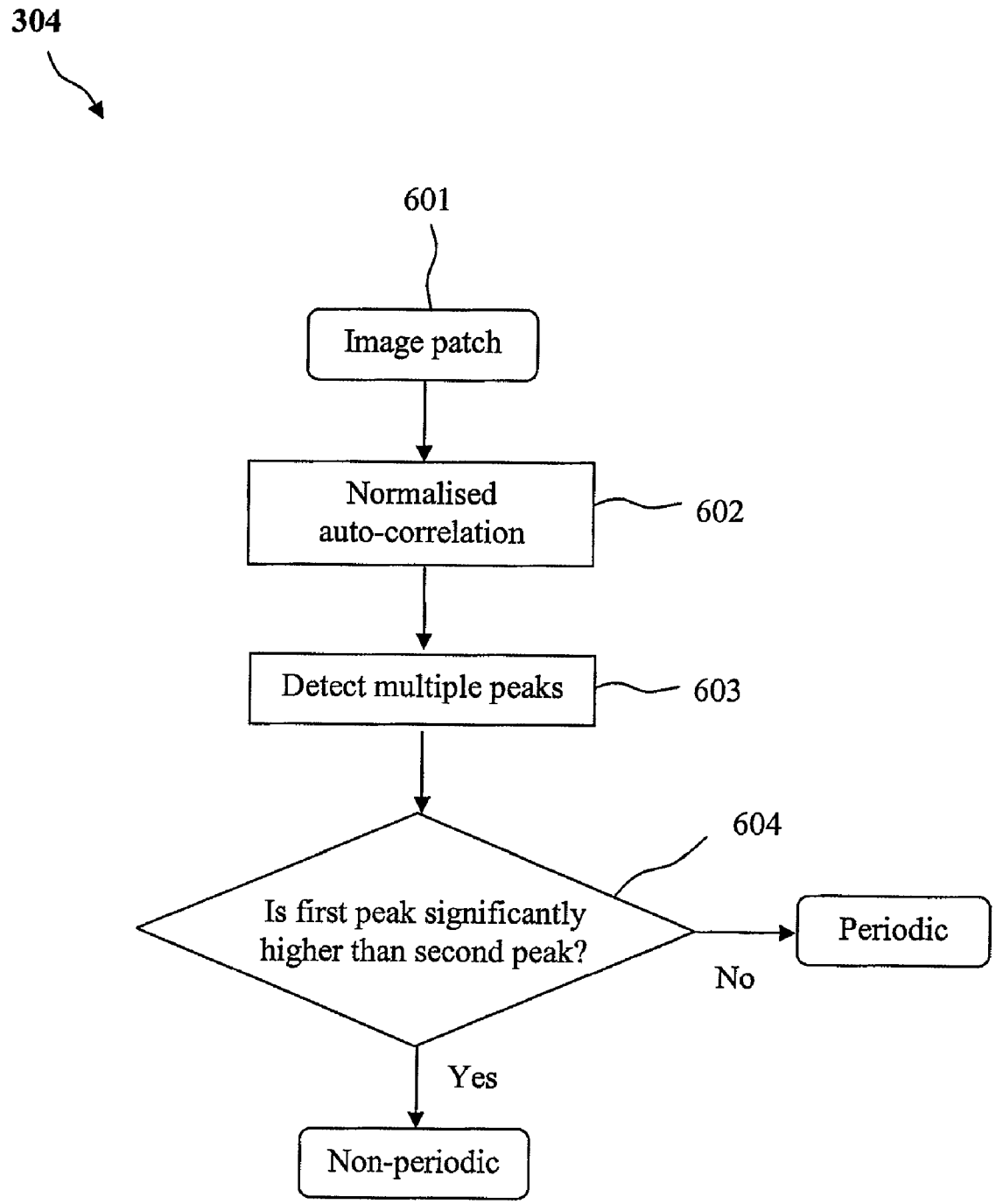
FIG. 6 is a schematic flow diagram illustrating a method of detecting periodic image patches as used in the method of FIG. 3.

The process of detecting periodic content of an image patch in step 304 is now described in more detail with reference to FIG. 6. Since a periodic pattern strongly correlates with a shifted version of itself, periodic patterns are not good candidates for alignment. An image patch is periodic if its auto-correlation image has multiple distinct peaks of comparable intensities. An image patch 601 is presented to step 602, which performs a normalised auto-correlation of the image patch 601. In step 603, multiple peaks are detected. In step 604, if the strongest peak is significantly higher than the second strongest peak (e.g., twice the height of the second strongest peak), the image patch is declared as non-periodic. Otherwise, the image patch is considered periodic and is therefore removed from the list of correlatable patches 305.

In the foregoing matter, the analysis of correlatability was applied to a single channel of the image. For instance, if the two images being aligned were RGB colour images, the alignment could be done against any of the R, G, or B channels separately, or against some combination of the colour channels, such as luminance $$Y = 0.3R + 0.59G + 0.11B$$

This approach does not take into account all of the information in the images that can be used for alignment. For instance, if alignment on the luminance channel is done, then regions of the images that are iso-luminant but polychromatic will be judged by the foregoing process to have low correlatability. This is because the correlatability analysis of the image does not take into account the colour content of the image.

A variation of the embodiment described above rectifies this problem by including colour information in the correlatability analysis. The simplest way to do this is to consider correlations of the colour vectors themselves. In this case, equation (8) may be written $$I^*_1(x,y) = I(x,y) + n_1(x,y)$$

$$I^*_2(x,y) = I(x',y') + n_2(x,y) \quad (25)$$

where bold letters denote vector quantities. In equation (25), we are assuming that the noise in different colour channels are normally distributed, with a cross correlation matrix given by $$S = \begin{pmatrix} \sigma_r^2 & \rho_{rg}\sigma_r\sigma_g & \rho_{rb}\sigma_r\sigma_b \\ \rho_{rg}\sigma_r\sigma_g & \sigma_g^2 & \rho_{gb}\sigma_g\sigma_b \\ \rho_{rb}\sigma_r\sigma_b & \rho_{gb}\sigma_g\sigma_b & \sigma_b^2 \end{pmatrix} \quad (26)$$

where $\rho_{rg}$ etc. are the correlation coefficients for the noise in the different channels.

Under this noise model, the log probability of the observed images is $$\log Pr(I|\hat{m}) = \qquad (27)$$
$$-\frac{1}{2}\sum_S \{(I_1^* - I)^T S^{-1}(I_1^* - I) + (I_2^* - I')^T S^{-1}(I_2^* - I')\} + \text{const.}$$

and the Fisher information matrix may be shown to be $$F_{ij} = \sum_S \left(\frac{\partial I'}{\partial m_i}\right)^T S^{-1}\left(\frac{\partial I'}{\partial m_j}\right) \quad (28)$$

For completeness, the inverse of the cross-correlation matrix may be written $$S^{-1} = \frac{1}{1-\rho_{rg}^2 - \rho_{rb}^2 - \rho_{gb}^2 + 2\rho_{rg}\rho_{rb}\rho_{gb}} \begin{pmatrix} \frac{1-\rho_{gb}^2}{\sigma_r^2} & \frac{\rho_{gb}\rho_{rb}-\rho_{rg}}{\sigma_g\sigma_r} & \frac{\rho_{gb}\rho_{rg}-\rho_{rb}}{\sigma_b\sigma_r} \\ \frac{\rho_{gb}\rho_{rb}-\rho_{rg}}{\sigma_g\sigma_r} & \frac{1-\rho_{rb}^2}{\sigma_g^2} & \frac{\rho_{rb}\rho_{rg}-\rho_{gb}}{\sigma_b\sigma_g} \\ \frac{\rho_{gb}\rho_{rg}-\rho_{rb}}{\sigma_b\sigma_r} & \frac{\rho_{rb}\rho_{rg}-\rho_{gb}}{\sigma_b\sigma_g} & \frac{1-\rho_{rg}^2}{\sigma_g^2} \end{pmatrix} \quad (29)$$

For the case of shift estimation, the FIM is still a 2×2 matrix. If the noise in each of the colour channels is uncorrelated, then this reduces to the sum of the Fisher information matrices of the individual colour channels. This FIM may be used instead of the FIM identified in equation (13) in all correlatability processing to determine the best correlatable patches. If this is done, then shift estimation must be done using all of the colour channels. This involves determining the parameters m that minimise the log probability given above.

Equivalently, one can maximise the correlation between the images, given by $$C(m) = \sum_S \{(I_2^*)^T S^{-1}(I')\} \quad (30)$$

Similarly to the case for the FIM analysis, for uncorrelated noise in the different colour channels, this reduces to maximising the sums of the correlations in each colour channel weighted by the variance in each colour channel:

$$C(m) = \sum_S \left\{\frac{1}{\sigma_r^2}I_{2r}^*I_r' + \frac{1}{\sigma_g^2}I_{2g}^*I_g' + \frac{1}{\sigma_b^2}I_{2b}^*I_b'\right\} \quad (31)$$

where the individual colour channels are labelled r, g, and b. In this case, each of the colour channels must be correlated, meaning that 3 correlations must be performed instead of just 1 in the case of a monochromatic or luminance image. If the noises are correlated, then all nine correlations between the colour channels must be calculated. This is a large increase in the computational cost of the algorithm.

An alternative approach that does not increase the computational cost so significantly is to determine a projection operator from the colour space onto one or two dimensions that give the highest correlatability for a given image region.

When two image regions are to be aligned, then the regions are projected into this optimal space, and the correlation is done between the projections. This reduces the computational cost of the algorithm and does not significantly reduce its accuracy, as colours in images are often embedded in lower dimensional manifolds within the 3 dimensional colour space.

To formulate this problem, consider a direction in colour space that we will denote by $v=(v_r,v_g,v_b)$ and which has unit magnitude, $|v|=1$. For a given image region, we want to determine the direction of this vector that minimises the variance of the registration parameters. To do this we must determine the FIM for this problem, which in turn is dependent on the log likelihood of the projected images. If we assume that the noise in the images is a multivariate Gaussian distribution with zero mean, then the noise of any projection of the image data onto a single dimension will be a Gaussian distribution with zero mean. Its variance will be given by $$\sigma_v^2 = v_r^2\sigma_r^2 + v_g^2\sigma_g^2 + v_b^2\sigma_b^2 + 2v_r v_g \rho_{rg}\sigma_r\sigma_g + 2v_{rvb}\rho_{rb}\sigma_r\sigma_b + 2v_g v_b \rho_{gb}\sigma_g\sigma_b \quad (32)$$

Thus, the log-likelihood of the images is given by $$\log Pr(I \cdot v \mid \hat{m}) = -\frac{1}{2\sigma_v^2}\sum_S \{(I_1^* \cdot v - I \cdot v)^2 + (I_2^* \cdot v - I' \cdot v)^2\} + \text{const.} \quad (33)$$

and the Fisher information matrix is given by $$F_{ij} = \frac{1}{\sigma_v^2}\sum_S v \cdot \left(\frac{\partial I'}{\partial m_i}\right)\left(\frac{\partial I'}{\partial m_j}\right) \cdot v \quad (34)$$

In shift estimation, the FIM may be written $$F(t) = \frac{1}{\sigma_v^2}\sum_S v \cdot \left(\frac{\partial I'}{\partial m_i}\right)\left(\frac{\partial I'}{\partial m_j}\right) \cdot v \quad (35)$$

To minimise the variance of the estimated shift parameters, we want to maximise the smallest eigenvalue of F subject to $|v|=1$. Alternately we may wish to maximise the product of the two eigenvalues, which is the same as maximising the determinant of the Fisher information matrix.

For shift estimation, the FIM can be expanded in terms of the image components. If we write $$I' = (r, g, b) \quad (36)$$

$$\frac{\partial I'}{\partial t_x} = \frac{\partial I'}{\partial x}\frac{\partial x}{\partial t_x} = \frac{\partial I'}{\partial x} = (r_x, g_x, b_x)$$

$$\frac{\partial I'}{\partial t_y} = \frac{\partial I'}{\partial y}\frac{\partial y}{\partial t_y} = \frac{\partial I'}{\partial y} = (r_y, g_y, b_y)$$

then the FIM may be written $$F(t) = \begin{pmatrix} \alpha_{00} & \alpha_{01} \\ \alpha_{10} & \alpha_{11} \end{pmatrix} \quad (37)$$

with $$\alpha_{00} = \frac{1}{\sigma_v^2}\left(v_r^2\sum_S r_x r_x + v_g^2\sum_S g_x g_x + v_b^2\sum_S b_x b_x + 2v_r v_g\sum_S r_x g_x + 2v_r v_b\sum_S r_x b_x + 2v_g v_b\sum_S g_x b_x\right) \quad (38)$$

$$\alpha_{11} = \frac{1}{\sigma_v^2}\left(v_r^2\sum_S r_y r_y + v_g^2\sum_S g_y g_y + v_b^2\sum_S b_y b_y + 2v_r v_g\sum_S r_y g_y + 2v_r v_b\sum_S r_y b_y + 2v_g v_b\sum_S g_y b_y\right)$$

$$\alpha_{01} = \alpha_{10} = \frac{1}{\sigma_v^2}\left(v_r^2\sum_S r_x r_y + v_g^2\sum_S g_x g_y + v_b^2\sum_S b_x b_y + v_r v_g\sum_S (r_y g_x + r_x g_y) + v_r v_b\sum_S (r_y b_x + r_x b_y) + v_g v_b\sum_S (g_y b_x + g_x b_y)\right)$$

If we are maximising the minimum eigenvalue, then for a given patch, the direction in colour space for correlatability analysis is given by the values of $(v_r,v_g,v_b)$ which maximises $$L = \alpha_{00} + \alpha_{11} - \sqrt{(\alpha_{00}-\alpha_{11})^2 + 4\alpha_{01}^2} \quad (39)$$

subject to the constraint that $$v_r^2 + v_g^2 + v_b^2 = 1 \quad (40)$$

This is a constrained maximisation problem that may be solved using standard numerical techniques, such as using the method of Lagrange multipliers to convert it to an unconstrained minimisation which may be solved using the Levenberg-Marquardt method. The value that L takes at the maximum is the correlatability for the patch.

In terms of the processing pipeline performed above, in step 301, when the lambda scale space is constructed, this operation is performed on all three channels. In step 302, when the minimum correlatable patch size is calculated, then the box filters of all the colour image derivative pairs, $$\sum_S r_x g_x$$

etc., must be calculated and substituted into the expression for L given above. Optimisation of the correct values of $(v_r,v_g,v_b)$ proceeds and the resulting correlatability is stored for later use.

When storing the correlatable patches, the values of $(v_r,v_g,v_b)$ should also be stored, so that the target patch to be aligned can also be transformed to the projected one dimensional colour channel before correlation is performed.

There is also another even simpler method of determining a direction in colour space in which to perform correlation, but it is not as optimal in terms of the image information content as the approach described above. If a patch is to have its correlatability assessed, then a principal component analysis of the colours in the patch may be performed to determine which direction in colour space has the greatest variation. The image data is then projected onto this direction, and the standard correlatability introduced in equation (24) is used. This can be extended to a two-dimensional analysis by taking the first two eigenvectors and projecting onto a two dimensional subspace. A complex number valued image can then be formed by using the projection onto the first eigenvector as the real part of the image and the projection onto the second eigenvector as the imaginary part of the image. These complex images can then be correlated using standard techniques.

This approach of performing Principal Component Analysis (PCA) on the colour data in a patch gives different results to the approach based on the Fisher Information Matrix, but practically speaking, this method is much faster. Also, it does not allow for correlated noise and noise of different amplitudes in the different colour channels, which are effects that happen in practice in imaging.

Applications of the fine image registration technique disclosed herein are numerous. Due to its adjustable computational footprint, the technique can be used by low-resourced systems when speed is more important than sub-pixel accuracy. Document alignment in MFPs (Multi-Function Peripherals) and panoramic image stitching on digital cameras are typical examples of this low-accuracy-end application. On the contrary, the fine image registration technique can be tuned for topmost accuracy at the expense of heavier computation. Off-line test chart alignment for imaging device calibration and super-resolution from video sequences using optical flow are examples of this high-accuracy-end spectrum.

Figure 7:
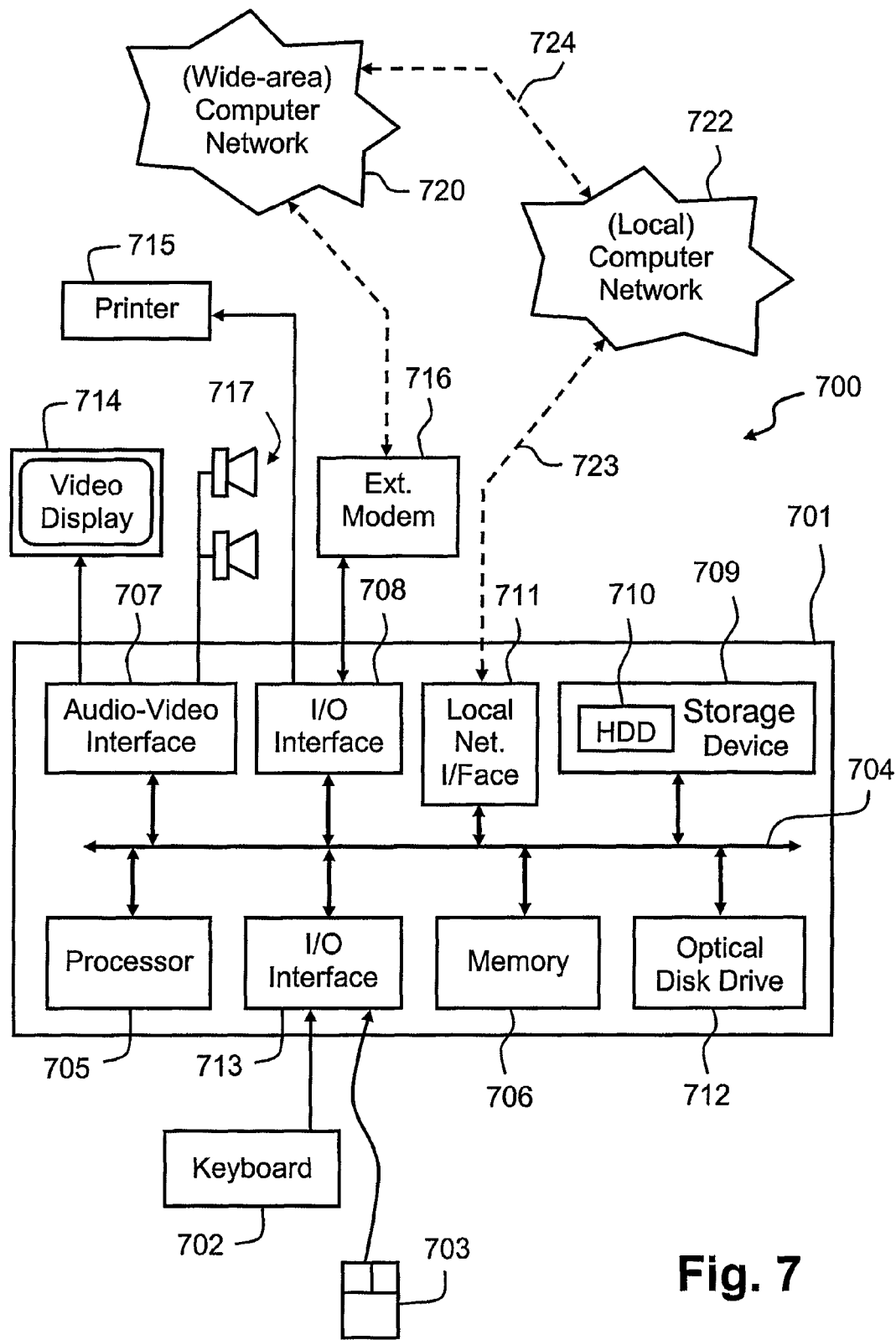
FIG. 7 is a schematic block diagram of a general purpose computer upon which arrangements described can be practised.

The method of determining a geometrical relationship between a first image and a second image may be implemented using a computer system 700, such as that shown in FIG. 7, wherein the processes of FIGS. 1 to 6 may be implemented as software, such as one or more application programs executable within the computer system 700. In particular, the steps of a method of determining a geometrical relationship between a first image and a second image are effected by instructions in the software that are carried out within the computer system 700. The instructions may be formed as one or more code modules, each for performing one or more particular tasks. The software may also be divided into two separate parts, in which a first part and the corresponding code modules perform the image patch, image area, and relationship determining methods and a second part and the corresponding code modules manage a user interface between the first part and the user. The software may be stored in a computer readable medium, including the storage devices described below, for example. The software is loaded into the computer system 700 from the computer readable medium, and then executed by the computer system 700. A computer readable medium having such software or computer program recorded on it is a computer program product. The use of the computer program product in the computer system 700 preferably effects an advantageous apparatus for determining a full warp map that relates a corrupted image to a reference image.

As seen in FIG. 7, the computer system 700 is formed by a computer module 701, input devices such as a keyboard 702 and a mouse pointer device 703, and output devices including a printer 715, a display device 714 and loudspeakers 717. An external Modulator-Demodulator (Modem) transceiver device 716 may be used by the computer module 701 for communicating to and from a communications network 720 via a connection 721. The network 720 may be a wide-area network (WAN), such as the Internet or a private WAN. Where the connection 721 is a telephone line, the modem 716 may be a traditional "dial-up" modem. Alternatively, where the connection 721 is a high capacity (e.g., cable) connection, the modem 716 may be a broadband modem. A wireless modem may also be used for wireless connection to the network 720.

The computer module 701 typically includes at least one processor unit 705, and a memory unit 706 for example formed from semiconductor random access memory (RAM) and read only memory (ROM). The module 701 also includes an number of input/output (I/O) interfaces including an audio-video interface 707 that couples to the video display 714 and loudspeakers 717, an I/O interface 713 for the keyboard 702 and mouse 703 and optionally a joystick (not illustrated), and an interface 708 for the external modem 716 and printer 715. In some implementations, the modem 716 may be incorporated within the computer module 701, for example within the interface 708. The computer module 701 also has a local network interface 711 which, via a connection 723, permits coupling of the computer system 700 to a local computer network 722, known as a Local Area Network (LAN). As also illustrated, the local network 722 may also couple to the wide network 720 via a connection 724, which would typically include a so-called "firewall" device or similar functionality. The interface 711 may be formed by an Ethernet™ circuit card, a wireless Bluetooth™ or an IEEE 802.11 wireless arrangement.

The interfaces 708 and 713 may afford both serial and parallel connectivity, the former typically being implemented according to the Universal Serial Bus (USB) standards and having corresponding USB connectors (not illustrated). Storage devices 709 are provided and typically include a hard disk drive (HDD) 710. Other devices such as a floppy disk drive and a magnetic tape drive (not illustrated) may also be used. An optical disk drive 712 is typically provided to act as a non-volatile source of data. Portable memory devices, such optical disks (eg: CD-ROM, DVD), USB-RAM, and floppy disks for example may then be used as appropriate sources of data to the system 700.

The components 705, to 713 of the computer module 701 typically communicate via an interconnected bus 704 and in a manner which results in a conventional mode of operation of the computer system 700 known to those in the relevant art. Examples of computers on which the described arrangements can be practised include IBM-PCs and compatibles, Sun Sparcstations, Apple Mac™ or alike computer systems evolved therefrom.

Typically, the application programs discussed above are resident on the hard disk drive 710 and read and controlled in execution by the processor 705. Intermediate storage of such programs and any data fetched from the networks 720 and 722 may be accomplished using the semiconductor memory 706, possibly in concert with the hard disk drive 710. In some instances, the application programs may be supplied to the user encoded on one or more CD-ROM and read via the corresponding drive 712, or alternatively may be read by the user from the networks 720 or 722. Still further, the software can also be loaded into the computer system 700 from other computer readable media. Computer readable storage media refers to any storage medium that participates in providing instructions and/or data to the computer system 700 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 701. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 714. Through manipulation of the keyboard 702 and the mouse 703, a user of the computer system 700 and the application may manipulate the interface to provide controlling commands and/or input to the applications associated with the GUI(s).

The method of determining a geometrical relationship between a first image and a second image may alternatively be implemented in dedicated hardware such as one or more integrated circuits performing the functions or sub-functions of coarsely aligning images, determining locations of correlatable image patches, determining a warp map, determining image areas, and determining image relationships. Such dedicated hardware may include graphic processors, digital signal processors, or one or more microprocessors and associated memories.

FURTHER EMBODIMENTS

Disclosed herein is a method of determining a full warp map that relates a corrupted image to a reference image. The method includes the steps of: coarsely aligning said corrupted image against said reference image by a rotation-scaling-translation transformation; using a theoretical variance bound to determine locations and sizes of a plurality of correlatable image patches from said reference images; and determining said warp map based on said patches.

In one embodiment, said theoretical variance bound is a Cramer-Rao lower bound of two-dimensional shift estimation.

In another embodiment, the variance bound is computed from a linear combination channel from the reference image.

In a further embodiment, the images are obtained from the group of images consisting of: (a) digital images of a document; (b) a video sequence that contains independently moving objects; (c) digital images of a scene with overlapping content; and (d) a digital image of a test chart.

INDUSTRIAL APPLICABILITY

It is apparent from the above that the arrangements described are applicable to the computer, data processing, and image processing industries.

The foregoing describes only some embodiments of the present invention, and modifications and/or changes can be made thereto without departing from the scope and spirit of the invention, the embodiments being illustrative and not restrictive.

We claim:

1. A computer-implementable method of estimating a geometrical relationship between a first image and a second image, said second image including a noise component, said method comprising the steps of:
    (a) determining a location and size of each one of a plurality of image patches for each of said images, based on the noise component included in said second image and correlation information derived from said first image, wherein the size of each of the plurality of image patches is determined using a Cramer-Rao lower bound of two-dimensional shift estimation;
    (b) identifying a plurality of first image areas in said first image and a corresponding plurality of second image areas in said second image, based on the location and size of each one of said plurality of image patches, wherein each first image area of said first image corresponds to a related second image area of said second image; and
    (c) determining a geometrical relationship between said first and second images by comparing, for each one of said first image areas, information located within said first image area with information located within said corresponding related second image area.

2. The method according to claim 1, wherein the first image is a reference image and the second image is a corrupted image.

3. The method according to claim 1, further including a step of coarsely aligning the first image and the second image by applying one or more of a rotation transformation, a scaling transformation, or a translation transformation to at least one of said first image and second image.

4. The method according to claim 1, wherein, for each one of said plurality of image patches, the correlation information relates at least in part to at least one colour in an area of said first image defined by the location and size of said image patch.

5. The method according to claim 4, wherein the location and size of each image patch is further determined based on correlation information located within an area of said first image defined by the location and size of each image patch, when colours in said area are projected onto either one of: (i) a one dimensional subspace of the colour space of at least one of the images; and (ii) a two dimensional subspace of the colour space of at least one of the images.

6. The method according to claim 1, wherein at least one of the first and second images is a downsized image.

7. The method according to claim 1, wherein the size and location of each image patch is determined based on an accuracy target, said accuracy target defining an amount of correlation information required within an area of said first image defined by the location and size of each image patch.

8. The method according to claim 1, wherein said step of comparing, for each one of said first image areas, information located within said first image area with information located within said corresponding related second image area, produces a translation estimate which is used to determine the relationship between the first image and the second image.

9. The method according to claim 8, wherein the translation estimate is defined as one or more of a rotation transformation, scaling transformation, or a translation transformation for at least one of the first image and the second image.

10. The method according to claim 1, wherein said correlation information derived from said first image is computed from a linear combination of channels from said first image.

11. The method according to claim 1, wherein said first and second images are obtained from the group of images consisting of:
    (a) digital images of a document;
    (b) a video sequence that contains independently moving objects;
    (c) digital images of a scene with overlapping content; and
    (d) a digital image of a test chart.

12. The method according to claim 1, wherein said determining step is further based on a second noise component included in said first image.

13. The method according to claim 1, wherein a first image patch having a location corresponding to a first region of said first image has a smaller size than a second image patch having a location corresponding to a second region of said first image, when said first region contains more correlation information than said second region.

14. The method according to claim 1, wherein said second image is a digital image derived by scanning an image on a printed medium.

15. The method according to claim 1, wherein said geometric relationship is a warp map.

16. A non-transitory computer readable storage medium having recorded thereon a computer program executable by a processor to estimate a geometrical relationship between a first image and a second image, said second image including a noise component, said program comprising:

(a) code for determining a location and size of each one of a plurality of image patches for each of said images, based on the noise component included in said second image and correlation information derived from said first image, wherein the size of each of the plurality of image patches is determined using a Cramer-Rao lower bound of two-dimensional shift estimation;

(b) code for identifying a plurality of first image areas in said first image and a corresponding plurality of second image areas in said second image, based on the location and size of each one of said plurality of image patches, wherein each first image area of said first image corresponds to a related second image area of said second image; and (c) code for determining a geometrical relationship between said first and second images by comparing, for each one of said first image areas, information located within said first image area with information located within said corresponding related second image area.

17. A computer-implementable method of estimating a geometrical relationship between a first image and a second image, said second image including a noise component, said method comprising the steps of:

(a) determining a location and size of each one of a plurality of image patches for each of said images, based on the noise component included in said second image and correlation information derived from said first image, wherein a first image patch, having a location corresponding to a first region of said first image, has a smaller size than a second image patch having a location corresponding to a second region of said first image, when said first region contains more correlation information than said second region;

(b) identifying a plurality of first image areas in said first image and a corresponding plurality of second image areas in said second image, based on the location and size of each one of said plurality of image patches, wherein each first image area of said first image corresponds to a related second image area of said second image; and (c) determining a geometrical relationship between said first and second images by comparing, for each one of said first image areas, information located within said first image area with information located within said corresponding related second image area.

* * * * *